United States Patent
Dillinger et al.

(10) Patent No.: US 7,039,405 B2
(45) Date of Patent: May 2, 2006

(54) METHOD FOR CONTROLLING A CONNECTING RELAY IN A RADIO COMMUNICATIONS SYSTEM

(75) Inventors: Markus Dillinger, Munich (DE); Jijun Luo, Munich (DE)

(73) Assignee: Siemens Aktiengesellschaft, Munich (DE)

(*) Notice: Subject to any disclaimer, the term of this patent is extended or adjusted under 35 U.S.C. 154(b) by 442 days.

(21) Appl. No.: 10/168,296

(22) PCT Filed: Dec. 19, 2000

(86) PCT No.: PCT/DE00/04535

§ 371 (c)(1),
(2), (4) Date: Jun. 20, 2002

(87) PCT Pub. No.: WO01/47309

PCT Pub. Date: Jun. 28, 2001

(65) Prior Publication Data

US 2003/0013448 A1     Jan. 16, 2003

(30) Foreign Application Priority Data

Dec. 20, 1999   (DE) ................. 199 61 516

(51) Int. Cl.
    *H04Q 7/20*     (2006.01)
(52) U.S. Cl. ............ 455/436; 455/438; 455/439; 455/525; 455/522
(58) Field of Classification Search ......... 455/436, 455/437, 438, 439, 442, 443, 444, 522, 69, 455/524, 525; 370/331, 332
See application file for complete search history.

(56) References Cited

U.S. PATENT DOCUMENTS

| | | | | |
|---|---|---|---|---|
| 5,508,708 A | | 4/1996 | Ghosh et al. ............... 742/457 |
| 5,771,451 A | * | 6/1998 | Takai et al. ................. 455/442 |
| 5,845,212 A | * | 12/1998 | Tanaka ....................... 455/437 |
| 5,901,354 A | | 5/1999 | Menich et al. .............. 455/442 |
| 5,987,326 A | * | 11/1999 | Tiedemann et al. ......... 455/442 |
| 6,038,448 A | * | 3/2000 | Chheda et al. .............. 455/436 |
| 6,151,502 A | * | 11/2000 | Padovani et al. ........... 455/442 |
| 6,393,287 B1 | * | 5/2002 | Munekata et al. .......... 455/442 |
| 6,603,971 B1 | * | 8/2003 | Mohebbi ..................... 455/437 |

FOREIGN PATENT DOCUMENTS

| WO | WO 95/12297 | 5/1995 |
|---|---|---|
| WO | WO 97/08911 | 3/1997 |
| WO | WO 99/04593 | 1/1999 |
| WO | WO 99/05873 | 2/1999 |
| WO | WO 99/60797 | 11/1999 |

* cited by examiner

*Primary Examiner*—Duc M. Nguyen
(74) *Attorney, Agent, or Firm*—Staas & Halsey LLP

(57) ABSTRACT

A radio communications system has a plurality of transmitter/receiver stations. At a certain point in time, a first set of said transmitter-receiver stations forms a group of active stations, which communicate with a mobile terminal device. When a requirement is detected, after a connection has been relayed, the number of active of stations is increased by at least one additional station. Thereafter, at least the station having the lowest transfer quality is removed from the active stations in order to close the connecting relay.

34 Claims, 4 Drawing Sheets

METHOD FOR CONTROLLING A CONNECTING RELAY IN A RADIO COMMUNICATIONS SYSTEM

CROSS REFERENCE TO RELATED APPLICATIONS

This application is based on and hereby claims priority to PCT Application No. PCT/DE00/04535 filed on Dec. 19, 2000 and German Application No. 199 615 16.0 filed on Dec. 20, 1999, the contents of which are hereby incorporated by reference.

BACKGROUND OF THE INVENTION

The invention relates to a method for controlling a handover in a radio communications system.

A mobile radio communications system typically comprises a multiplicity of transceiver stations or base stations which exchange radio signals with mobile terminals which are located within the range of these stations, and at least one administration unit which switches user data between mobile terminals which are located within the range of different base stations, or between a mobile terminal and a fixed network.

A "W-CDMA" mobile radio communications system such as the TDD mode of the forthcoming third-generation UMTS mobile radio system (Universal Mobile Telecommunication System) provides the facility for a mobile terminal to communicate at a given time with a subset of these transceiver stations by receiving user data associated with a single call connection on different channels of a plurality of these stations, and, conversely, user data transmitted by the terminal are also received by this plurality of stations. This subset is also designated as the active set.

The purpose of this intrinsically redundant transmission is the avoidance of transmission gaps if the mobile terminal moves out of range of a station with which it is communicating; if it is communicating with one single station only, the radio link is interrupted when it moves outside its range and the user data transmission from and to the terminal cannot continue until a different station is allocated to said terminal, the user data which are to be transmitted to the terminal are switched to this station, and the terminal and the new station can be synchronized with one another. On the other hand, in the event of simultaneous communication with a plurality of stations, failure of the radio link between the mobile terminal and one of the stations does not yet result in interruption of the transmission, since said transmission continues to run unchanged via the other stations, while an alternative station is defined for the failed station and communication is set up with said alternative station. This type of station changeover with continuation of the communication with one or more other stations is referred to as "soft" handover.

However, simultaneous communication with a plurality of stations entails a substantial loading of the switching and transmission capacity of the radio communications system. If each active terminal occupies transmission channels of a plurality of stations, the number of mobile radio subscribers which can be served simultaneously with a given network infrastructure is of course considerably smaller than if each terminal uses only one channel of a station. Similarly, in the mobile terminal, the need to process receive signals from a plurality of channels can result in increased power consumption and therefore in a reduction of the network-independent usage time of a terminal of this type. A compromise between transmission reliability and transmission capacity therefore needs to be found, which is usually such that, for a radio communications system of this type, the maximum number of stations which may belong to the active set is defined as a small value of e.g. 2 or 3.

The stations which belong to the active set are identified using regularly repeated evaluations of the quality of transmission between the mobile terminal and the stations which are able to communicate with it. For this purpose, the mobile terminal measures the quality of radio signals which it receives from these stations. Stations which do not belong to the active set, but whose transmission quality, from one evaluation to the next, has become higher than that of a station of the active set, are reported to an administration unit which adds them to the active set and in return excludes the poorer station.

Simulation experiments have shown that, in a system of this type, it may often be the case that the quality of transmission between the mobile terminal and all stations of the active set becomes so poor between two transmission quality evaluations that the entire active set must be replaced at once. This results in a transmission gap. Such a situation may arise in particular if the mobile terminal is moving in an urban environment, where roads bordered by buildings can transport a radio signal over long distances in a longitudinal direction, but will screen it in a transverse direction, so that a terminal located on a road of this type may have an active set in which only relatively far-distant stations are located. As soon as the terminal moves into a transverse road, transmission from and to all the stations may be virtually simultaneously interrupted.

From WO99/04593, a method is known for the selection of base stations for communication with a mobile station, in which the mobile station receives signals from a plurality of base stations, referred to as the "candidate set", identifies a relevant receive strength and compares it with a first threshold value. Base stations whose receive strengths lie above the threshold value are reported to a base station controller as suitable for inclusion in the active set of base stations. The mobile station identifies the need for changes to the current active set through measurements of the energies of pilot signals of the base stations of the active set and the candidate set, and through dynamic adaptation of the threshold values.

One potential object for the invention is to provide a method for controlling a soft handover with which high immunity of the transmission to interruptions is achieved without loading the switching and transmission capacity due to substantially increased redundancy, and without resulting in a significant increase in the power requirement of the terminal.

SUMMARY OF THE INVENTION

While the mobile terminal is located in a designated typical normal operating condition, a check is preferably carried out periodically to ascertain whether there is at least one station among the transceiver stations which do not belong to the active set which is suitable as an additional station in the event that a handover must be carried out. The check may be carried out at a frequency of at least 1 Hz. A station of this type, referred to below as a candidate station, is added to the active set if a need for a handover is established. The periodic repetition of the check is required in order to ensure that the candidate station is still suitable if this need actually arises. Communication between the candidate station and the mobile terminal can then be set up immediately without losing valuable time in identifying a suitable candidate station.

According to a first alternative, in order to identify the candidate stations, the transmission quality of a radio signal originating from the mobile terminal can be measured at the transceiver stations which do not belong to the active set, and the stations which receive the best signal are selected as the candidate stations. In such a case, it is appropriate for the measured transmission qualities to be transferred from the stations to an administration unit of the radio communications system, which selects the candidate stations on the basis of the transferred transmission qualities.

According to a second alternative, the mobile terminal can measure the transmission quality of radio signals which originate from transceiver stations which do not belong to the active set, and one or more transceiver stations which reveal the highest transmission quality are selected as candidate stations. The selection can be carried out by the mobile terminal and reported to an administration unit of the radio communications system, or the mobile terminal transmits the measurement results to the administration unit, which selects the candidate stations.

This second alternative can usually be implemented at lower cost than the first. Since an administration unit is normally responsible for a large number of terminals, substantial computing outlay may be required in the administration unit in the first alternative in order to allocate the transmission qualities delivered by the stations for each individual mobile terminal to the individual terminals, to compare them and to select suitable candidates. If, however, according to the second alternative, the transmission qualities are measured by the mobile terminal, the expensive allocation is not required, thereby relieving the load on the administration unit.

The need for a handover is preferably identified if the qualities of transmission between the mobile terminal and the transceiver stations of the active set fall below a limit value. The transmission quality considered here may be that of the uplink transmission (from the mobile terminal to the station) and/or that of the downlink transmission (from the station to the mobile terminal).

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
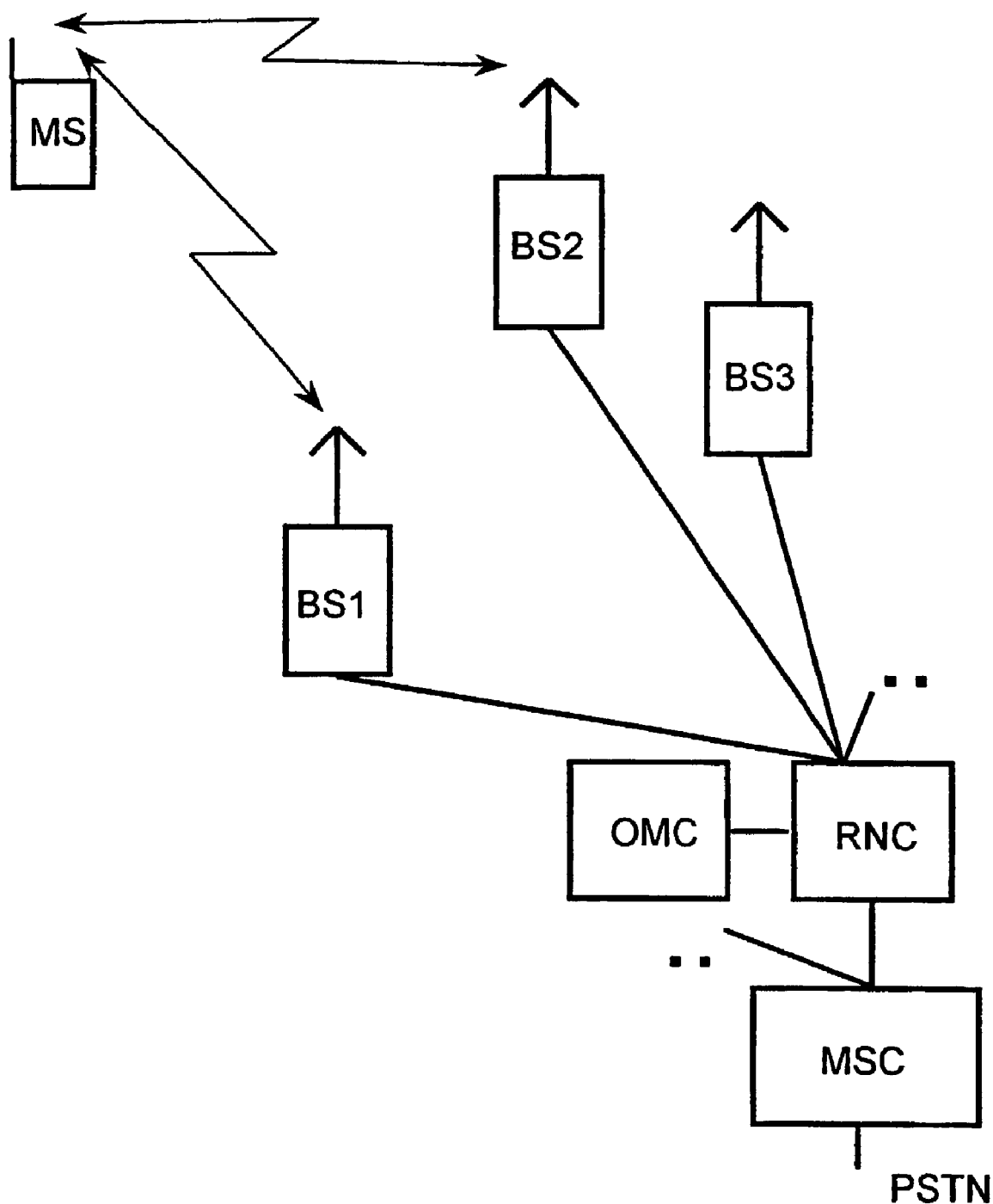
FIG. 1 shows a block diagram of a radio communications system, in particular a mobile radio system.

Reference will now be made in detail to the preferred embodiments of the present invention, examples of which are illustrated in the accompanying drawings, wherein like reference numerals refer to like elements throughout.

The mobile radio system shown in FIG. 1 as an example of a radio communications system comprises a multiplicity of mobile switching centers MSC, which are networked with one another or which set up access to a fixed network PSTN. Furthermore, these mobile switching centers MSC are in each case connected to at least one terminal RNC for allocation of radio resources, previously referred to as the administration unit. Each of these terminals RNC in turn enables a connection to at least one base station BS. A base station BS of this type can set up a connection via a radio interface to subscriber stations, e.g. mobile stations MS or other mobile and stationary terminals. At least one radio cell is formed by each base station BS. An operation and maintenance center OMC implements monitoring and maintenance functions for the mobile radio system or for parts thereof.

The functionality of this structure can be transferred to other radio communications systems. Examples of such systems are the GSM and FDD mode of the UMTS mobile radio system, or mobile radio systems based on the American standard IS-95 with CDMA subscriber separation. One aspect of the invention relates in particular to W-CDMA systems, but is generally applicable to any radio communications system which offers the facility for a plurality of radio links to an individual terminal to be maintained, on which a plurality of stations in each case transmit the same user data to the terminal or user data transmitted by the terminal are received and processed by a plurality of stations.

In order to explain different designs of the method, a radio communications system with a plurality of base stations BS1, BS2, . . . and an administration unit is considered. A mobile terminal MS moves in the geographical area covered by the base stations, at different distances from the individual base stations and with different transmission qualities between it and the base stations.

Figure 2:
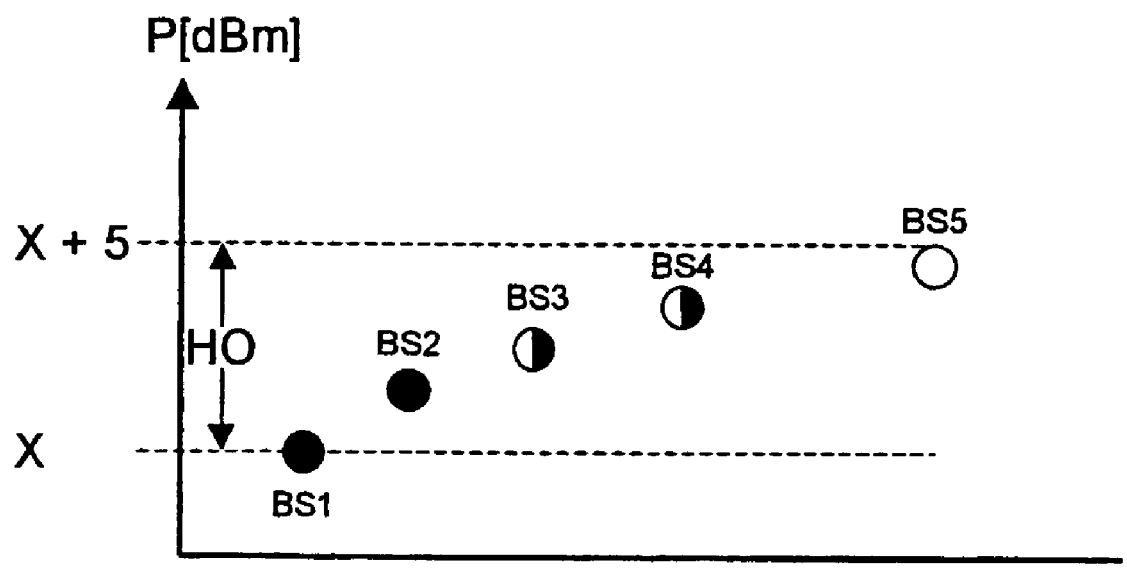
FIG. 2 shows the results of an evaluation of the quality of transmission between a mobile terminal and the individual stations of a radio communications system.

FIG. 2 shows in diagrammatic form the transmission qualities between the mobile terminal MS and five base stations BS1, BS2, BS3, BS4, BS5. The minimum transmit power p which the mobile terminal MS requires in order to transmit to the relevant base stations BS1 . . . BS5 while maintaining a given error quota is plotted on the vertical axis of the diagram as a measure of the transmission quality. The BS with the lowest minimum transmit power, i.e. the lowest on the diagram, is in each case regarded as the BS with the highest transmission quality.

In the diagram in FIG. 2, BS1 has the highest transmission quality. Its minimum transmit power forms the lower limit of a tolerance interval referred to as the handover margin HO, which, in a normal operating condition of the radio communications system, has a width of e.g. 5 dB. Further base stations BS2, BS3, BS4, BS5 lie within this interval. Any available base stations with a higher minimum transmit power are not shown.

In the radio communications system considered here as an example, the active set comprises a maximum of 2 elements in the normal operating condition, i.e. a call connection of the mobile terminal runs simultaneously via a maximum of two base stations, which transmit the same user data to or receive the same user data from the mobile terminal. In FIG. 2, the active set comprises the stations BS1 and BS2 shown by a solid black dot, which require the lowest transmit power.

At regular intervals, the mobile terminal checks the transmission quality of the base stations in whose range it is located, e.g. by measuring the receive field strength of synchronization signals which the base stations continuously emit. This check may remain restricted to stations whose receive field strength on the mobile terminal does not fall below a given percentage of the receive field strength of the strongest station BS1. These stations are generally identical to those in the HO margin. In the case of FIG. 2, a check of this type indicates that, after the stations BS1 and BS2 of the active set, stations BS3 and BS4 are the next weakest stations. The mobile terminal reports these two stations to the administration unit as candidate stations which would be suitable replacements for the stations BS1 and BS2, if the connection to the latter were to be interrupted. The candidate stations are in each case shown as semi-solid black dots, whereas the weakest station BS5 is shown by an unshaded circle in the diagram.

While the mobile terminal is moving, the strength ratios of the individual stations may shift in relation to one another. If, for example, the receive signal from BS3 becomes stronger than that from BS2, BS2 is excluded from the active set and is replaced by BS3. To avoid having to change the composition of the active set too frequently in the event of substantially changing receive conditions, a hysteresis is provided, whereby receive signals are replaced by one another only if the receive signal of the station which is getting stronger is, for example, 1 dB stronger than that of the station which is getting weaker.

In this way, it is ensured in the case of most applications that the active set constantly contains base stations with adequately high transmission quality, so that the occasional exclusion of a station from the active set and its replacement by a differentstation does not adversely affect the communication of the mobile terminal.

If the quality of transmission between the mobile terminal and the stations of the active set is generally poor, situations may easily arise in which, within a time interval between two transmission quality checks, the connection to all stations of the active set is interrupted. This risk can be reduced by allowing a larger active set, i.e. by providing multiple-redundancy transmission from and to the mobile terminal. However it is clear that a solution of this type would severely restrict the total capacity of a radio communications system, and would therefore increase costs for operators and users.

Figure 3A:
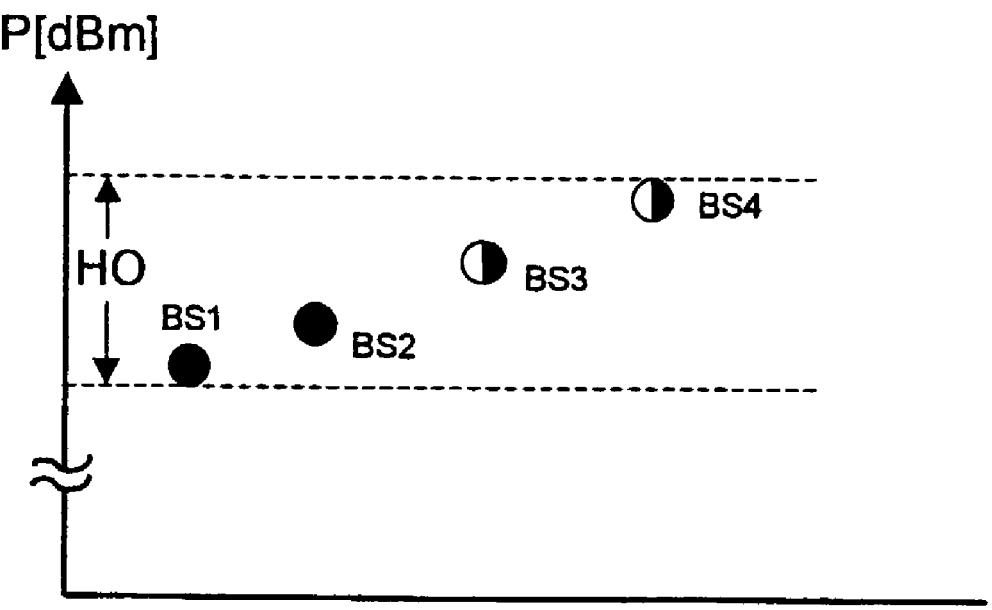
FIGS. 3a to 3c show a sequence of evaluation results at different times during and after a handover procedure.
Figure 3B:
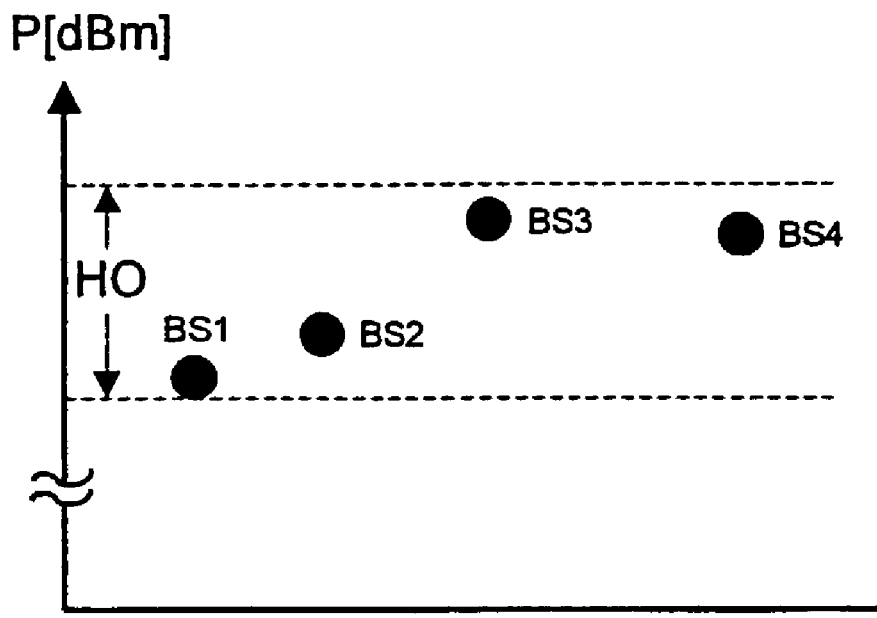
Figure 3C:
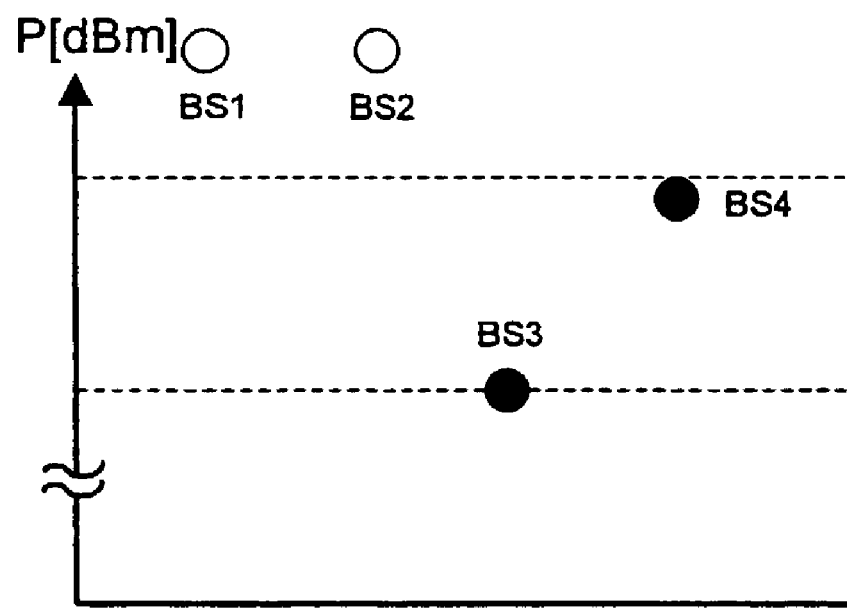

FIGS. 3a to 3c shows a situation of this type, in which the minimum transmit powers of all stations BS1 to BS4 are clearly higher than in the case shown in FIG. 2. The periodic checking of the transmission quality, which can be carried out in the stations of the active set in particular by measuring the bit error rate or the signal interference ratio, delivers critically poor values, so that a slight further deterioration could result in interrupted communication. In this situation, the mobile terminal transmits a special warning signal, which is intercepted by the stations of the active set BS1 and BS2 and forwarded to the administration unit. The radio communications system then switches to a temporary operating condition in which the number of stations which may belong to the active set is increased, whereby the administration unit adds the candidate stations BS3 and BS4 to the active set and transmits a related message back to the mobile terminal. The mobile terminal then also begins, in addition to the channels used by BS1 and BS2, to process receive signals on those channels which the administration unit has allocated to the base stations BS3 and BS4, and to reconstruct the user data intended for it from the signals received on these four channels.

FIG. 3b shows this temporary operating condition, wherein all four base stations BS1 to BS4 are shown here as solid black dots:.

FIG. 3c shows a situation at a later time, where, on the basis of the situation shown in FIG. 3b, the transmission quality of the base stations BS1 and BS2 has simultaneously deteriorated, whereas the transmission quality of BS3 has clearly improved so that it is now the strongest station and defines the position of the HO margin. Since BS3 has belonged to the active set since the condition shown in FIG. 3b, the mobile terminal has been able to communicate constantly via it, and the deterioration in the transmission quality of BS1 and BS2 has not resulted in interrupted communications. A transmission quality check carried out at the time shown in FIG. 3c has indicated that BS1 and BS2 have moved out from the HO margin. The mobile terminal reports this to the administration unit, which then excludes BS1 and BS2 from the active set, i.e. user data intended for the mobile terminal are no longer forwarded to these stations. The active set then comprises only the stations BS3 and BS4, whereby the normal operating condition is restored and a soft handover is completed.

If BS1 and BS2, in contrast to the situation shown in FIG. 3c, were still located within the HO margin, the return to the normal operating condition would be completed in that, following a predefined duration of the temporary operating condition of e.g. 10 seconds, the mobile terminal reports the two poorest stations to the administration unit during a transmission quality check, whereupon the administration unit excludes these stations from the active set.

The method can also be applied to radio communications systems which provide different base station transmit powers depending on the receive situation on the mobileterminal. To control the transmit power, the mobile terminals of such a system transmit commands in the form of "TPC" (Transmit Power Control) bits to the base stations to cause them to reduce or increase their transmit power. If a base station receives a command to reduce the transmit power from a mobile terminal in the temporary operating condition, this is a sure indication that the transmission quality of this terminal is again high. The reception of a command of this type therefore also gives cause to return to the normal operating condition.

Figure 4:
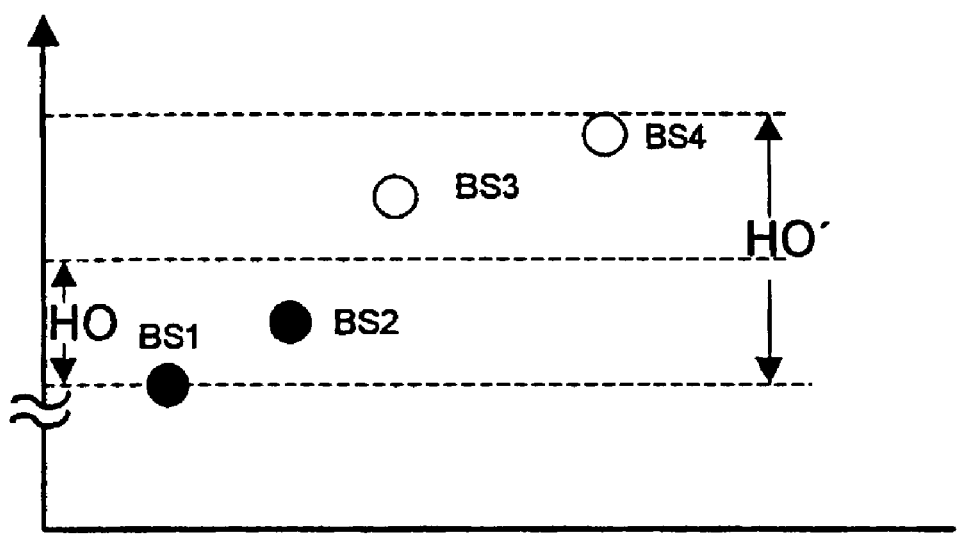
FIGS. 4 and 5 in each case show evaluation results at the beginning of handover procedures.

FIG. 4 shows a different situation with critically poor transmission conditions. BS1 is again assumed to be the strongest base station. The station BS2 still remains within its HO margin HO, whereas the next weakest stations BS3 and BS4 lie outside. In its periodic transmission quality check, the mobile terminal therefore finds no suitable candidate stations in the HO margin HO, and consequently also reports none to the administration unit. This is uncritical as long as the transmission quality of the base stations of the active set is high, i.e. there is still no risk of sudden interruption of the communication with them. If, however, as in the situation considered here, the transmission quality of the active set is also poor, the mobile terminal increases the HO margin to e.g. 10 dB, reports this to the administration unit and begins to look for candidate stations in this increased HO margin HO'. It finds the stations BS3 and BS4 in the increased HO margin HO' and reports them to the administration unit. If the administration unit then receives the warning signal from the mobile terminal, it switches to the temporary operating condition by adding BS3 and BS4 to the active set. The return to the normal operating condition takes place as described above.

Figure 5:
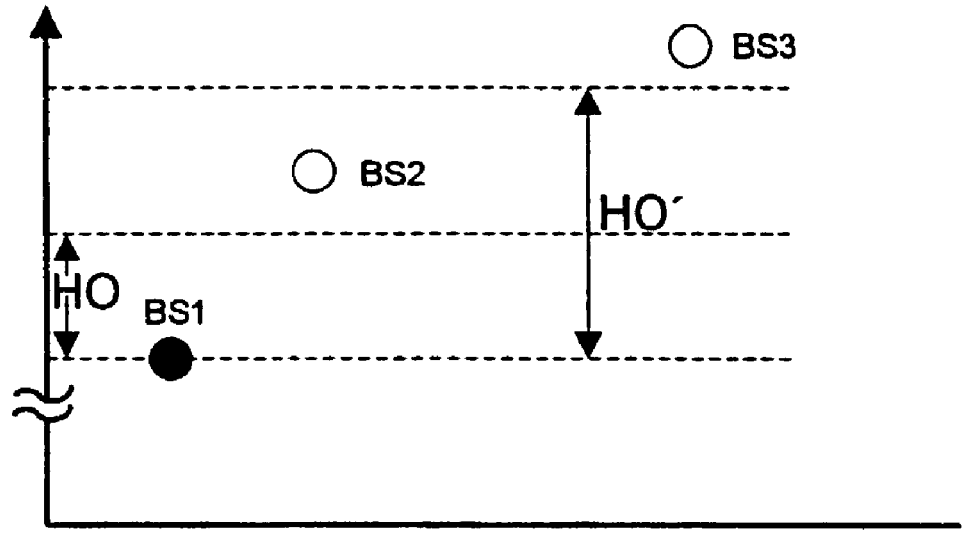

FIG. 5 describes a situation in which the HO margin of the strongest station BS1 contains no further station. Since, in the normal operating condition, only those stations which lie within the HO margin HO are included in the active set, the active set in this case is smaller than the maximum value of 2 which is used here as an example. If the transmission quality of the station BS1 falls under a limit value, the mobile terminal extends the HO margin, as described with reference to FIG. 4. In the extended margin HO margin HO', it finds the station BS2 and reports it as a candidate station. On receiving the warning signal, the administration unit switches to the temporary operating condition and adds BS2 to the active set. The active set then contains two stations, i.e. no more than is also permitted in the normal operating condition. If both stations BS1 and BS2 lie in the original HO margin HO at the end of the temporary operating condition, the station BS2 remains in the active set; all that is then required in order to return to the normal operating condition is for the mobile terminal to reverse the extension of the HO margin HO.

Various permutations of the method described here are possible. Thus, for example, the changeover from the narrow to the extended HO margin HO can be made dependent on an approval of the administration unit.

The maximum permissible number of base stations in the active set may be greater than 2. For the maximum number of candidate stations which are reported to the administration unit, a fixed value can be predefined which is greater than 2, but can also be 1. Instead of this, however, a maximum number of stations which are permitted to belong to the active set in the temporary operating condition can also be predefined. If the active set does not attain its maximum permissible size in the normal operating condition, correspondingly more candidate stations can then be measured and added in the temporary operating condition to the active set.

Instead of a receive quality check by measurements on the mobile terminal, or in addition to these measurements, corresponding measurements can also be carried out on the base stations of the active set and the temporary operating condition can be initiated if these measurements reveal a signal power which is too low, a bit error rate which is too high or a signal interference ratio which is too low. Since each base station can only measure its own transmission quality, the measurement results are transmitted to the administration unit, which, with the knowledge of the transmission qualities reported by the stations of the active set and, where appropriate, by the mobile terminal, makes a decision on the transition to the temporary operating condition.

Furthermore, base stations can independently apply to the administration unit as candidate stations for a specific terminal if they do not belong to its active set, but are able to receive its radio signal well. Here, it can be provided that a base station applies particularly if its transmission capacity is poorly utilized. If a station of this type is added if necessary to the active set, this loads the capacity of the radio communications system less than in the case of a heavily utilized station.

The invention has been described in detail with particular reference to preferred embodiments thereof and examples, but it will be understood that variations and modifications can be effected within the spirit and scope of the invention.

The invention claimed is:

1. A method for controlling a handover in a radio communications system having a multiplicity of transceiver stations, comprising:
    communicating with a mobile terminal through a first set of transceiver stations, wherein the first set of transceiver stations forms an active set of stations, and
    adding at least one additional station to the active set of stations during a handover, thereby forming an extended set, the extended set communicating with the mobile terminal and being formed once a need for the handover has been established,
    wherein a periodic check is carried out among transceiver stations that do not belong to the active set of stations, to determine whether within a handover margin below a highest transmission quality there is at least one candidate station that is suitable as an additional transceiver station for communication with the mobile terminal if a handover is initiated, and
    wherein if there is no candidate station within the handover margin, the handover margin is extended to include at least one candidate station, which is added to the active set of stations to form the extended set.

2. The method for controlling a handover in a radio communications system as claimed in claim 1, further comprising creating a new set of transceiver stations following a delay, to communicate with the mobile terminal, the new set being formed by excluding at least the transceiver station of the extended set which has the lowest transmission quality.

3. The method for controlling a handover in a radio communications system as claimed in claim 1, wherein the periodic check for a candidate station is carried out with a frequency of at least 1 Hz.

4. The method for controlling a handover in a radio communications system as claimed in claim 1, wherein
    the transmission quality of a radio signal transmitted by the mobile terminal to each of the transceiver stations that do not belong to the active set is identified, and
    the transceiver station with a highest transmission quality is selected as a candidate station.

5. The method for controlling a handover in a radio communications system as claimed in claim 4, wherein the transmission quality is evaluated with reference to at least one of a strength of a receive signal, a required transmit power of the mobile terminal, a bit error rate and a signal interference ratio.

6. The method for controlling a handover in a radio communications system as claimed in claim 4, wherein
    the transmission quality of each transceiver station not belonging to the active set is transmitted to an administration unit in the radio communications system, and
    the administration unit selects the candidate station.

7. The method for controlling a handover in a radio communications system as claimed in claim 6, wherein,
    once the need for the handover has been established, the administration unit causes at least one candidate station to set up communications with the mobile terminal.

8. The method for controlling a handover in a radio communications system as claimed in claim 1, wherein
    the mobile terminal identifies the transmission quality of radio signals which are transmitted by transceiver stations which do not belong to the active set, and
    at least the transceiver station whose transmission quality exceeds a specific limit value is selected as a candidate station.

9. The method for controlling a handover in a radio communications system as claimed in claim 8, wherein
    the mobile terminal performs a selection to select the candidate station, and
    a result of the selection is transmitted to an administration unit in the radio communications system.

10. The method for controlling a handover in a radio communications system as claimed in claim 9, wherein, once the need for the handover has been established, the administration unit causes at least one candidate station to set up communications with the mobile terminal.

11. The method for controlling a handover in a radio communications system as claimed in claim 10, wherein the identification of the candidate station is carried out with a frequency of at least 1 Hz.

12. The method for controlling a handover in a radio communications system as claimed in claim 1, wherein the need for a handover is identified if transmission qualities between the mobile terminal and the transceiver stations of the active set fall below a specific limit value.

13. The method for controlling a handover in a radio communications system as claimed in claim 12, wherein
the mobile terminal evaluates the transmission quality between the mobile terminal and each transceiver station of the active set and assesses the need for the handover,
the mobile terminal communicates the need for the handover to the administration unit of the radio communications system.

14. The method for controlling a handover in a radio communications system as claimed in claim 12, wherein
the transmission quality is evaluated at each transceiver station of the active set each transmission quality is reported to the administration unit of the radio communications system, and
the administration unit identifies the need for the handover.

15. The method for controlling a handover in a radio communications system as claimed in claim 14, wherein
the mobile terminal evaluates the transmission quality between the mobile terminal and each transceiver station of the active set and assesses the need for the handover,
the mobile terminal communicates the need for the handover to the administration unit of the radio communications system.

16. The method for controlling a handover in a radio communications system as claimed in claim 15, wherein the transmission quality is evaluated with reference to at least one of a strength of a receive signal, a required transmit power of the mobile terminal, a bit error rate and a signal interference ratio.

17. The method for controlling a handover in a radio communications system as claimed in claim 1, wherein the extended set is formed for a limited time which ends when a command to reduce the transmit power is exchanged between the mobile terminal and one of the transceiver stations.

18. The method for controlling a handover in a radio communications system as claimed in claim 1, wherein the extended set is formed for a limited time which is ended by an administration unit, based on a report received from the mobile terminal.

19. The method for controlling a handover in a radio communications system as claimed in claim 1, wherein the extended set is formed for a limited time which ends after a predefined duration.

20. A mobile communications network comprising:
a plurality of base stations to communicate with a mobile terminal, each of the plurality of base stations having a transmission quality, the plurality of base stations comprising:
an active set, comprising those of the plurality of base stations that have a transmission quality greater than or equal to a minimum transmission quality wherein the active set actively communicates redundantly with the mobile terminal;
a candidate set, comprising those of the plurality of base stations that have a transmission quality greater than or equal to the minimum transmission quality but are not in the active set;
an inactive set, comprising those of the plurality of base stations that have a transmission quality less than the minimum transmission quality; and
a changing mechanism to add at least one base station from the candidate set to the active set to thereby form an extended set, the extended set communicating with the mobile terminal and being formed once a need for a handover has been established, the extended set being formed for a limited time,
wherein a periodic check is carried out among transceiver stations that do not belong to the active set of stations, to determine whether within a handover margin below a highest transmission quality there is at least one candidate station that is suitable as an additional transceiver station for communication with the mobile terminal if a handover is initiated, and
wherein if there is no candidate station within the handover margin, the handover margin is extended to include at least one candidate station, which is added to the active set of stations to form the extended set.

21. The mobile communications network of claim 20, wherein each of the base stations in the inactive set evaluates the transmission quality between itself and the mobile terminal, wherein each of the base stations in the inactive set reports the transmission quality to an administration unit, and wherein the administration unit selects a base station from the inactive set for inclusion in the candidate set when the base station from the inactive set demonstrates a transmission quality within the handover margin.

22. The mobile communications network of claim 21, wherein the transmission quality is evaluated based on a field strength, as measured at the mobile terminal, of synchronization signals continuously emitted by the base stations.

23. The mobile communications network of claim 20, wherein the mobile terminal measures the transmission quality between the mobile terminal and the inactive set.

24. The mobile communications network of claim 23, wherein the measuring comprises measuring the receive field strength of synchronization signals continuously emitted by the base stations.

25. The mobile communications network of claim 23, wherein the mobile terminal selects a base station from the inactive set for inclusion in the candidate set when the base station from the inactive set demonstrates a transmission quality within the handover margin, and wherein the mobile terminal reports the selection to an administration unit.

26. The mobile communications network of claim 23, wherein the mobile terminal reports the results of the measured transmission quality to an administration unit, and wherein the administration unit selects a base station from the inactive set for inclusion in the candidate set when the base station from the inactive set demonstrates a transmission quality within the handover margin.

27. The mobile communications network of claim 20, wherein the handover margin is a range from a minimum transmit power required for a best base station signal to 5 db more than the minimum transmit power.

28. The mobile communications network of claim 20, wherein a base stations in the active set is replaced by a base station from the candidate set when the transmission quality of the replaced base station in the active set is less than the transmission quality of the base station in the candidate set by 1 dB or greater.

29. The mobile communications network of claim 20, wherein the base stations in the candidate set are transferred into the active set when the highest transmission quality of the base stations in the active set falls below a predetermined threshold.

30. The mobile communications network of claim 29, wherein the active set is restored to its original size when the highest transmission quality of the base stations in the active set exceeds the predetermined threshold.

31. The mobile communications network of claim 20, wherein a base station in the active set is transferred into the inactive set when the transmission quality of the base station falls outside of the handover margin.

32. The mobile communications network of claim 20, wherein the mobile terminal transmits a command to one of the plurality of base stations controlling the base station's transmit power.

33. The method for controlling a handover in a radio communications system as claimed in claim 20, wherein the extended set is formed for a limited time which is ended by an administration unit, based on a report received from the mobile terminal.

34. The method for controlling a handover in a radio communications system as claimed in claim 20, wherein the extended set is formed for a limited time which ends after a predefined duration.

* * * * *